(12) United States Patent
Schimmelpfennig et al.

(10) Patent No.: US 11,207,819 B2
(45) Date of Patent: Dec. 28, 2021

(54) TRIM PART FOR A MOTOR VEHICLE, AS WELL AS METHOD AND DEVICE FOR ITS MANUFACTURE

(71) Applicant: International Automotive Components Group GmbH, Duesseldorf (DE)

(72) Inventors: Eugen Schimmelpfennig, Lambrecht (DE); Sascha Rauch, Cologne (DE); Georg Prahst, Lauenau (DE); Manfred Hoffmann, Langlingen (DE)

(73) Assignee: AURIA SOLUTIONS UK I LTD, London (GB)

(*) Notice: Subject to any disclaimer, the term of this patent is extended or adjusted under 35 U.S.C. 154(b) by 302 days.

(21) Appl. No.: 15/903,822

(22) Filed: Feb. 23, 2018

(65) Prior Publication Data
US 2018/0311886 A1 Nov. 1, 2018

(30) Foreign Application Priority Data
Feb. 24, 2017 (DE) ...................... 10 2017 103 943.0

(51) Int. Cl.
  *B29C 51/16* (2006.01)
  *B29C 51/08* (2006.01)
  (Continued)

(52) U.S. Cl.
  CPC .............. *B29C 51/16* (2013.01); *B29C 43/56* (2013.01); *B29C 51/02* (2013.01); *B29C 51/08* (2013.01);
  (Continued)

(58) Field of Classification Search
  CPC ......... B29C 51/16; B29C 51/02; B29C 51/08; B29C 51/082; B29C 51/10; B29C 51/145;
  (Continued)

(56) References Cited

U.S. PATENT DOCUMENTS 4,825,974 A * 5/1989 Hoffmann ................. B32B 7/06
                                                     181/286
5,334,338 A * 8/1994 Kittel ........................ B32B 5/20
                                                     264/46.4
(Continued)

FOREIGN PATENT DOCUMENTS

DE  30 07 434 A1  9/1981
DE  9309206 U1  11/1994
(Continued)

OTHER PUBLICATIONS

European Search Report and Opinion dated Jun. 25, 2018 relating to corresponding application No. EP 18158397.

*Primary Examiner* — Jeffrey M Wollschlager
*Assistant Examiner* — Xue H Liu
(74) *Attorney, Agent, or Firm* — Steven J. Grossman; Grossman, Tucker, Perreault & Pfleger, PLLC (57) ABSTRACT

The present disclosure pertains to a trim part for a motor vehicle that comprises: a carrier; and a decorative material applied onto an upper surface of the carrier, wherein the decorative material comprises a printed thermoplastic film; and wherein the trim part is shaped by a deep-drawing process and a grain or impression is produced on the visible side of the film, which faces away from the carrier, by the deep-drawing process. A method and a device for manufacturing the trim part is also proposed.

18 Claims, 3 Drawing Sheets

(51) Int. Cl.
| | |
|---|---|
| *B29C 51/10* | (2006.01) |
| *B29C 51/14* | (2006.01) |
| *B60R 13/02* | (2006.01) |
| *B29C 51/02* | (2006.01) |
| *B44C 5/04* | (2006.01) |
| *B29C 43/56* | (2006.01) |
| *B32B 3/30* | (2006.01) |
| *B32B 5/02* | (2006.01) |
| *B32B 27/08* | (2006.01) |
| *B32B 27/12* | (2006.01) |
| *B32B 27/32* | (2006.01) |
| *B29L 31/30* | (2006.01) |
| *B29C 43/02* | (2006.01) |
| *B29C 59/02* | (2006.01) |
| *B29C 51/42* | (2006.01) |
| *B29C 51/26* | (2006.01) |
| *B32B 38/12* | (2006.01) |
| *B32B 37/00* | (2006.01) |
| *B29C 51/30* | (2006.01) |
| *B29K 105/08* | (2006.01) |
| *B29K 105/06* | (2006.01) |
| *B29L 31/00* | (2006.01) |
| *B29C 48/07* | (2019.01) |
| *B29C 48/00* | (2019.01) |
| *B29K 23/00* | (2006.01) |

(52) U.S. Cl.
CPC .......... *B29C 51/082* (2013.01); *B29C 51/10*
(2013.01); *B29C 51/145* (2013.01); *B32B 3/30*
(2013.01); *B32B 5/022* (2013.01); *B32B 27/08*
(2013.01); *B32B 27/12* (2013.01); *B32B 27/32*
(2013.01); *B44C 5/0453* (2013.01); *B60R*
*13/02* (2013.01); *B29C 43/021* (2013.01);
*B29C 48/0017* (2019.02); *B29C 48/07*
(2019.02); *B29C 51/264* (2013.01); *B29C*
*51/30* (2013.01); *B29C 51/423* (2013.01);
*B29C 59/02* (2013.01); *B29C 2043/562*
(2013.01); *B29C 2791/001* (2013.01); *B29C*
*2791/006* (2013.01); *B29C 2791/007*
(2013.01); *B29C 2793/0081* (2013.01); *B29C*
*2795/002* (2013.01); *B29K 2023/12* (2013.01);
*B29K 2105/06* (2013.01); *B29K 2105/0854*
(2013.01); *B29K 2995/0097* (2013.01); *B29L*
*2031/3041* (2013.01); *B29L 2031/722*
(2013.01); *B32B 37/156* (2013.01); *B32B*
*38/12* (2013.01); *B32B 2307/718* (2013.01);
*B32B 2307/732* (2013.01); *B32B 2451/00*
(2013.01); *B32B 2605/003* (2013.01)

(58) Field of Classification Search
CPC ..... B29C 51/264; B29C 51/30; B29C 51/423;
B29C 43/56; B29C 43/021; B29C
2043/562; B29C 2791/006; B29C
2791/007; B29C 2793/0081; B29C
2795/002
USPC ........................................................ 264/322
See application file for complete search history.

(56) References Cited

U.S. PATENT DOCUMENTS

| | | | |
|---|---|---|---|
| 5,709,925 A | 1/1998 | Spengler et al. | |
| 7,698,817 B2* | 4/2010 | Khambete | ............... B60R 13/02 |
| | | | 29/897.2 |
| 2003/0030188 A1* | 2/2003 | Spengler | ............. B29C 37/0032 |
| | | | 264/458 |
| 2004/0094986 A1* | 5/2004 | Landvik | ................ B32B 27/065 |
| | | | 296/70 |
| 2005/0140059 A1 | 6/2005 | Ernst et al. | |
| 2005/0161865 A1 | 7/2005 | Bristorw et al. | |
| 2009/0130401 A1 | 5/2009 | Paruchuri et al. | |
| 2016/0039363 A1* | 2/2016 | Turker | ................... B32B 27/20 |
| | | | 428/319.9 |

FOREIGN PATENT DOCUMENTS

| | | |
|---|---|---|
| DE | 94 22 147 U1 | 7/1998 |
| DE | 10009281 C1 | 3/2001 |
| DE | 10163601 A1 | 7/2003 |
| DE | 102 08 524 B4 | 7/2004 |
| DE | 20 2004 014 470 U1 | 7/2005 |
| DE | 10 2008 046 770 A1 | 3/2010 |
| DE | 10 2008 062 200 A1 | 7/2010 |
| EP | 1989959 A1 | 11/2008 |

\* cited by examiner

TRIM PART FOR A MOTOR VEHICLE, AS WELL AS METHOD AND DEVICE FOR ITS MANUFACTURE

BACKGROUND

In the prior art, it is known to manufacture trim parts of motor vehicles, particularly interior trim parts such as an instrument panel, a door trim panel, a center console, a rear window shelf, a trunk cover, a floor trim panel, a side trim panel, an engine cowling and the like, of nonwoven or fleece fiber materials.

For example, DE 102 08 524 B4 describes a method for manufacturing shaped parts of nonwoven fiber materials. The shaped part consists of a nonwoven fiber material that is provided with a thermoplastic binder and thermally or mechanically pre-compressed into a precursor product. The precursor product is heated until the binder plasticizes and compressed in a compression molding tool. The solidified shaped part with the desired structure is obtained after the binder between the fibers of the nonwoven material has cooled and hardened.

DE 94 22 147 U1 discloses a multilayer body for an interior trim part of a motor vehicle with a carrier layer, which comprises a core layer that includes natural fibers and cover layers including binders and fibers and are arranged to both sides of said core layer.

Other shaped parts of nonwoven fiber materials are described in DE 30 07 434 A1, DE 10 2008 046 770 A1, DE 10 2008 062 200 A1 and DE 20 2004 014 470 U1.

Known shaped parts for interior trim parts of motor vehicles, particularly shaped parts of nonwoven fiber materials, typically include cover layers that form the visible surfaces. For example, cover materials such as decorative films, PVC films, TPO films or other plastic films, leather or textiles are used for designing the surface and, if applicable, laminated onto the shaped part using PU foam. The lamination of the shaped parts serves for protecting these shaped parts from external stresses such as strikes and scratches, the penetration of moisture and dirt, UV irradiation and the like, they also are used for improving the haptics of the shaped parts and/or for achieving a desired optical appearance such as a certain coloring, grain or different surface design.

Figure 1:
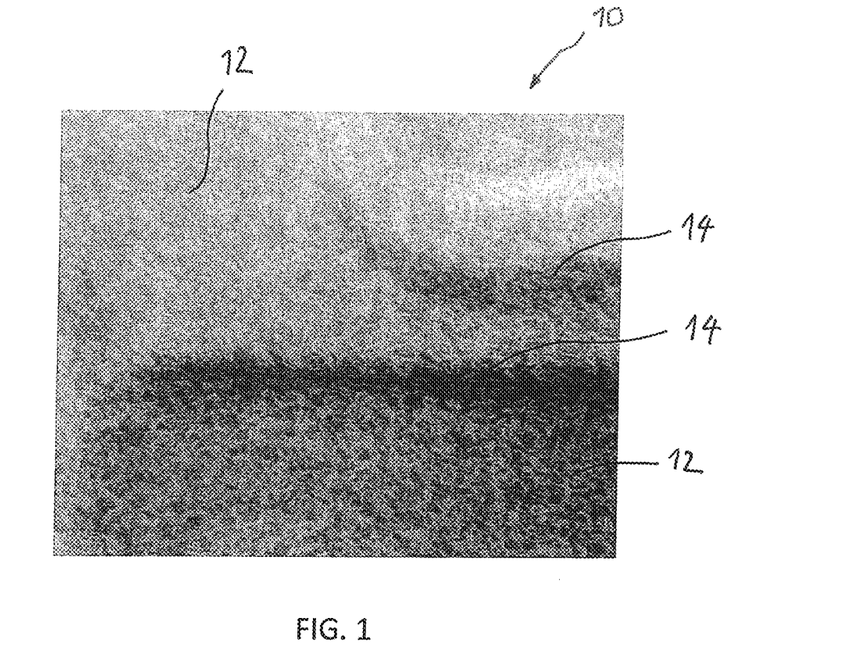
FIG. 1 shows a detail of a three-dimensionally shaped trim part.

FIG. 1 shows a detail of a three-dimensionally shaped trim part 10 according to an example of the prior art. The trim part is made of a carrier material in the form of a mixed-fiber nonwoven material and may provide, for example, a trunk cover, a trunk side trim panel, a trim panel of a trunk floor or cargo area floor, a cover or cowling in the engine compartment, a wheelhouse trim, another floor trim panel, for example, in the passenger compartment or another interior trim panel, for example an instrument panel, a column trim, a door trim panel or even an exterior trim part. The trim part is three-dimensionally shaped by deep-drawing. As shown in FIG. 1, the trim part 10 comprises relatively plane surfaces 12 and more significantly deformed regions 14. When such a trim part is manufactured by deep-drawing in a compression mold, the compression mold exerts an essentially perpendicular force upon the relatively plane surfaces 12 whereas the force applied to the more significantly deformed regions 14 is directed at an angle or even parallel or nearly parallel to the surface of the trim part 10. In these regions, conventional processes make it virtually impossible to transfer a surface structure of a mold surface onto the trim part, e.g., in order to produce a grain or impression on the surface of the trim part without distortion. Even if the trim part is shaped with unstructured and smooth mold surfaces, an uncontrollable contraction of the cover layer and therefore an undesirable deformation of the surface of the trim part can occur in the significantly deformed regions 14 due to a relative material displacement within the trim part and/or due to material shrinkage during the cooling process, wherein this can lead to a change of the surface similar to an orange peel effect.

A trim part for a motor vehicle is disclosed that can be manufactured with little effort, has a variable surface design and is robust against external stresses.

SUMMARY

A trim part for a motor vehicle may comprise a carrier or supporting base and a decorative material applied onto an upper surface of the carrier, wherein the decorative material comprises a printed thermoplastic film, and wherein the trim part is shaped by a deep-drawing process and a grain or impression is produced on the visible side of the film, which faces away from the carrier, by the deep-drawing process. Due to the combination of printing the decorative material and producing the grain, it is not only possible to provide the trim part with a plurality of different optical surface designs, but the surface structure, i.e. the haptics of the trim part, can also be adapted to the optical surface design without having to use a material that actually corresponds to the surface design. For example, the decorative material may be printed with the image of a needle-punched nonwoven material and the grain or impression may have a structure that corresponds to the surface structure of a needle-punched nonwoven material. In another example, the decorative material may be printed with the image of a wood veneer and the grain or impression may have a structure that corresponds to the surface structure of the wood veneer. In other examples, the decorative material may be printed with the image of a woven fabric, a knitted fabric, a textile, a carpet, a leather, a sponge, a lawn, a gravel surface, a moss surface, a foliage ground, a coniferous ground, etc., and the structure of the grain or impression may be an imitation of the surface structure that corresponds to the depicted surface. In this way, the trim part can be realized with a closed surface that is protected against external influences and at the same time optically and haptically "simulate" an almost arbitrary surface design.

The film may be printed on its side that faces away from the carrier and provided with a varnish layer or the film may be transparent or translucent and printed on its side that faces the carrier. The film may also be provided with a varnish layer in the latter instance. The varnish layer may comprise, for example, a 1K or 2K PU varnish and serves for protecting the trim part against external stresses such as strikes and scratches, the penetration of moisture and dirt, UV irradiation and the like. Also the film of the decorative material may also be equipped accordingly in order to fulfill this protective function or part of the protective function.

The carrier may comprise a nonwoven fiber material layer and/or a heavy layer. The nonwoven fiber material layer may include a fiber mixture that comprises at least one of the following fiber types: synthetic fibers, e.g. synthetic fibers on the basis of PP, PE, PES, PA and/or PET, natural fibers, e.g. natural fibers consisting of kenaf, hemp, flax, jute and/or sisal, and binding fibers, e.g. thermoplastic bicomponent fibers or simple thermoplastic binding fibers. The heavy layer may include a thermoplastic polymer, for example on the basis of PP or TPO, or a TP/TPO composite. The heavy layer may produce a mechanical decoupling between the fiber carrier material and the decorative material and provide a smooth surface for applying the decorative material. The heavy layer also serves as a protective layer for the decorative material lying thereon and provides this decorative material with sufficient stability for producing a permanent grain or impression in the surface of the composite material.

The carrier preferably comprises the nonwoven fiber material layer and the heavy layer, wherein the nonwoven fiber material layer may have a weight, e.g., between 50 $g/m^2$ and 2000 $g/m^2$, particularly between 600 $g/m^2$ and 1200 $g/m^2$, and a thickness between 3 mm and 6 mm and the heavy layer may have a weight, e.g., between 600 $g/m^2$ and 2000 $g/m^2$ and a thickness between 0.2 mm and 2 mm. The decorative material may include an airtight or air-permeable film of a thermoplastic elastomer, for example on the basis of TPO, PPO, PP, PE and/or PET, of PVC or synthetic leather or even have an open-pored structure, for example with a weight between 300 $g/m^2$ and 100 $g/m^2$ and a thickness between 0.3 mm and 1.0 mm, particularly between 0.33 mm and 0.45 mm. However, these indications merely serve as examples and other weights and layer thicknesses, as well as other materials, can be chosen depending on the respective requirements and the intended use. An altogether lightweight yet stable trim part can be manufactured due to the structure of the carrier in the form of a combination of a nonwoven fiber material layer and a heavy layer.

Depending on the design of the carrier layer and/or the heavy layer, the inventive trim part may also be acoustically effective and used as sound insulation in the vehicle interior and in the engine compartment. It may be used in conjunction with one or more absorber layers on its rear side, as well as in conjunction with a foam layer.

A method for manufacturing a trim part for a motor vehicle may comprise: supplying a carrier material and a decorative material in the form of a composite material; heating the composite material; introducing the heated composite material into a compression molding tool that includes a first mold half with a first mold surface and an opposite second mold half with a second mold surface, wherein the decorative material faces the first mold surface; closing the compression molding tool in order to mold the composite material by deep-drawing; and changing the pressure within the closed molding tool in order to draw and/or press the composite material against the first mold surface. Since the composite material is drawn and/or pressed against the first mold surface during the deep-drawing process, the composite material not only can be provided with the desired shape, but a surface structure of the first mold half can also be reliably and completely transferred to the surface of the composite material facing the first mold half. For example, if the first mold half has a grain structure or other impression structure, this structure can be transferred to the surface of the composite material in order to produce a grain or impression on this surface.

As mentioned above, methods for deep-drawing shaped parts according to the prior art, in which a grain is simultaneously produced, are associated with the problem that the grain structure of the mold surface either does not produce the grain at all or in a distorted fashion at the locations, at which the first and second mold halves do not meet in a plane perpendicular to the compressive force, i.e. at the locations, at which a significant deformation of the shaped part takes place. Even if no grain is produced, there still is a risk of a perceivable material displacement occurring on the surface of the composite material, wherein this material displacement can be referred to as orange peel effect. A reason may be that the compression molding tool exerts a reduced pressure upon the surface of the shaped part at the locations, at which the two mold halves converge at an angle or parallel to the compressive force such that the surface structure of the mold surfaces is not or not reliably transferred onto the surface of the shaped part and/or the compressive force is not introduced perpendicular to the surfaces of the mold part in a controlled fashion. The shaped part is drawn and/or pressed against one of the mold surfaces by an additional force within the closed molding tool. In this way, a reliable and complete contact between the surface of the mold part and the surface of the molding tool and therefore a reliable transfer of a corresponding surface structure or a smooth surface design is respectively ensured.

The composite material can be drawn against the first mold surface by applying a negative pressure or vacuum and/or pressed against the first mold surface by applying an overpressure. The negative pressure or the vacuum can be generated by applying a suction force through the first mold half and/or the overpressure can be generated by applying compressed air or steam through the second mold half.

If a grain structure is formed on the first mold half, a grain can be produced on the entire surface of the decorative material without distortion by drawing and/or pressing the composite material against the first mold half.

Prior to its introduction into the compression molding tool, the composite material may be heated to a temperature of approximately 100° C. to 250° C. and the temperatures of the two mold halves of the compression molding tool can be respectively adjusted to approximately 10° C. to 80° C., for example 20° C. to 40° C. or 30° C. to 60°. Furthermore, the composite material can be heated to a lower temperature on the side of the decorative material than on the side of the carrier material, wherein the temperature on the side of the decorative material may amount, for example, to approximately 120° C. to 190° C. and the temperature on the side of the carrier material may amount, for example, to approximately 220° C. to 240° C. It is likewise possible to adjust different temperatures on the two mold halves of the compression molding tool in order to adapt the cooling and hardening process of the trim part to the materials on the decorative side and the carrier side of the composite material. The heating of the composite material outside the compression molding tool and the deep-drawing of the composite material in a cooled or tempered compression molding tool makes it possible to adjust and maintain precisely reproducible process conditions and to optimize the molding and removal process in terms of time. The composite material is sufficiently heated such that it can be easily shaped and the grain or impression can be produced, wherein the trim part already begins to cool and therefore harden in the compression molding tool due to the cooling or tempering of the compression mold immediately after the molding process.

It is also possible to apply a foam layer onto the rear side of the composite material within the same mold or another mold. This can be realized by back-foaming.

The composite material may be composed of a fiber carrier material, an extruded heavy layer and the decorative material, all of which are connected to one another by a lamination process, wherein the heavy layer produces a mechanical decoupling between the fiber carrier material and the decorative material.

A device for manufacturing a trim part for a motor vehicle may comprise: a heating device for heating a plate material of the trim part; and a compression molding tool that includes a first mold half with a first mold surface and an opposite second mold half with a second mold surface for deep-drawing the plate material, wherein the mold halves define a mold cavity; wherein the compression molding tool includes a device for changing the pressure within the mold cavity in order to draw and/or press the plate material against the first mold surface. The device for changing the pressure may be designed in such a way that it applies a negative pressure or a vacuum to the first mold surface and/or exerts an overpressure upon the second mold surface.

The device for changing the pressure may comprise, for example, a vacuum generator and/or a compressed air or steam source, wherein the vacuum generator is coupled to the first mold half in order to apply the negative pressure or the vacuum to the first mold surface through the first mold half and/or the compressed air or steam source is coupled to the second mold half in order to exert the overpressure upon the second mold surface through the second mold half. The first mold half and/or the second mold half may contain bores for applying the negative pressure or the vacuum and/or for exerting the overpressure.

A grain structure or impression structure may be formed on the first mold surface.

The heating device may comprise a contact heating unit or an infrared heating unit that is designed for heating the plate material to a temperature of approximately 100° C. to 250° C. prior to its introduction into the compression molding tool.

The heating device may be designed in such a way that it heats the two sides of the plate material to different temperatures, wherein the temperature on a first side may amount, for example, to approximately 120° C. to 190° and the temperature on the second side may amount, for example, to approximately 220° C. to 240° C.

The compression molding tool may furthermore be coupled to a tempering device in order to cool the compression molding tool and, for example, to maintain its temperature at approximately 10° C. to 80° C., particularly 30° C. to 60° C.

In another example, a skin may be applied onto the second mold half in order to form an air cushion die. The skin may consist, for example, of a film that is deep-drawn on the second mold surface and peripherally connected to the second mold surface in an airtight fashion. Such an air cushion die makes it possible to also exert pressure upon a plate material with the aid of compressed air or steam and to thereby press said plate material against the surface of the opposite first mold surface if the plate material itself is air-permeable.

BRIEF DESCRIPTION OF THE FIGURES

Examples are described below with reference to the drawings.

DESCRIPTION OF A FEW EXAMPLES

Figure 2:
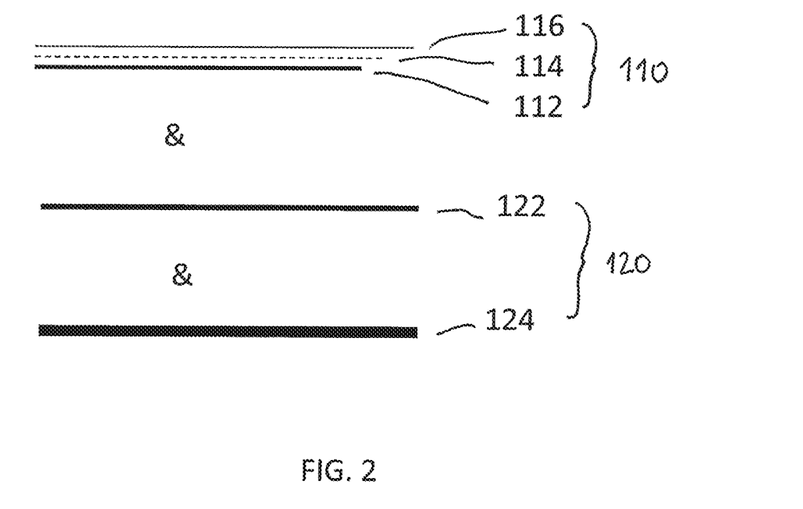
FIG. 2 shows a schematic exploded view of the structure of a composite material for a trim part according to an example.

FIG. 2 shows a schematic exploded view of the structure of a composite material for a trim part according to an example. In the example shown, the composite material is composed of a decorative material 110, a heavy layer 122 and a carrier layer 124. The heavy layer 122 and the carrier layer 124 jointly form a carrier 120. In alternative examples, the carrier 120 may also comprise only a heavy layer 122 or only a carrier layer 124. In the example shown, the decorative material 110 comprises a film 112, a printed layer 114 and a varnish layer 116. In another example, the decorative material 110 may also comprise only the film 112 and the printed layer 114, wherein the printed layer 114 may be applied onto the visible side or A-side of the film 112 facing away from the carrier 120 or onto the B-side of the film 112 facing the carrier 120.

The film 112 may consist, for example, of a TPO film, i.e. a film of a thermoplastic elastomer on the basis of olefin such as PP (polypropylene) or EPDM (ethylene-propylene-diene rubber). Other materials such as PE (polyethylene), PET (polyethylene terephthalate), PVC (polyethylene terephthalate), PS (polystyrene), PLA (polylactide), PA (polyamide) or PPE (polyphenylene ether), a combination of these materials and/or a multilayer composite of different materials may also be used in the film 112. The film material may furthermore contain additives such as color pigments, fillers, stabilizers, processing aids, UV protectants, etc. The film 112 may be airtight or air-permeable. An air-permeable film can be manufactured, for example, by producing micropores in a film consisting of one of the aforementioned materials. Other open-pored material structures may also be used as film material.

The printed layer 114 may be applied by transfer printing, wherein other printing methods such as inkjet printing, digital offset printing, for example liquid-based electrophotographic technology or a different type of digital printing, may also be used. In a few examples, the printed layer 114 may depict an image that represents a surface material such as a nonwoven fabric, a felt, a wood veneer, a woven fabric, a knitted fabrics, a carpet, a textile, a leather, a sponge, a lawn, a gravel surface, a moss surface, the foliage ground, a coniferous ground, etc.

The varnish layer 116 may comprise a PU varnish or another protective varnish, which is applied onto the film 112 in the form of a liquid or powder by brushing, rolling, immersing, spraying or the like or in the form of a thin film. The varnish layer 112 protects the decorative material no against external influences such as strikes and scratches, chemicals, UV irradiation, moisture, dirt and the like. It furthermore creates a smooth surface such that the decorative material and therefore the trim part can be easily cleaned.

The decorative material no with the film 112, the printed layer 114 and the varnish layer 116 is manufactured in advance before it is connected to the carrier 120. For example, it may have a thickness on the order of 0.25 mm to 1.0 mm, particularly 0.33 mm to 0.45 mm, and a weight on the order of 300 g/m$^2$ to 1000 g/m$^2$, particularly 300 g/m$^2$ to 600 g/m$^2$, especially 350 g/m$^2$ to 500 g/m$^2$. With respect to the decorative material, it is possible to choose from a broad variety of weights and thicknesses, as well as materials, depending on the respective requirements and the intended use of the trim part.

The heavy layer 122 may contain a thermoplastic polymer and, for example, either consist of an extruded layer of PP (polypropylene) or TPO or contain PP or TPO. It may also consist of a TP/TPO composite. It may be manufactured, for example, with a thickness on the order of 0.2 mm to 2 mm and with a weight on the order of 600 g/m$^2$ to 2000 g/m$^2$ or even 200 g/m$^2$ to 2000 g/m$^2$, e.g. with a weight of approximately 600 g/m² or 1800 g/m². The material, the thickness and the weight of the heavy layer are also dependent on the respective requirements and the intended use of the trim part.

The carrier layer 124 may include or consist of a mixed-fiber nonwoven fabric, wherein synthetic fibers, e.g. synthetic fibers on the basis of PP, PE, PES, PA and/or PET, natural fibers, e.g. natural fibers consisting of kenaf, hemp, flax, jute and/or sisal, and binding fibers, e.g. thermoplastic bicomponent fibers or simple thermoplastic binding fibers, may be contained in the carrier layer 124. It may be manufactured, for example, with a thickness on the order of 2 mm to 6 mm and with a weight on the order of 50 g/m² to 2000 g/m², particularly 600 g/m² to 1200 g/m², e.g. with a weight of approximately 600 g/m² or 800 g/m². The material, the thickness and the weight of the carrier layer are likewise dependent on the respective requirements and the intended use of the trim part.

Depending on the respective requirements, it is possible to use combinations of a relatively thick heavy layer and a comparatively thin nonwoven carrier layer and, vice versa, of a relatively thick and heavy nonwoven carrier layer and a relatively thin heavy layer. These requirements may concern the stability and strength of the composite material, but also, for example, its overall weight, which may vary between 1,000 g/m² and 3000 g/m². In a concrete example, a decorative layer of TPO with a weight of 300 g/m², a heavy layer of PP with a weight of 600 g/m² and a carrier layer of mixed-fiber nonwoven material with a weight of a 600 g/m² are used such that the overall weight amounts to 1550 g/m², wherein this merely represents one example of a broad variety of potential material combinations.

In a few examples, the weight of the carrier layer 124 is lower than the weight of the heavy layer. This makes it possible to manufacture a trim part with a low overall weight, which still has a high stability, as well as a sound moldability and dimensional stability, wherein a grain or another impression can be precisely and permanently produced. The heavy layer may particularly produce a mechanical decoupling between the decorative material and the carrier layer, as well as provide a smooth surface for applying the decorative material and an optimal support for producing a grain or impression.

Recycling materials, for example on the basis of PP and TPO, may be used for manufacturing the decorative film 112 and the heavy layer 122. The rigidity, strength, elasticity, weight and the like of the individual layers can be adjusted in dependence on the mixing ratio of the materials, for example the mixing ratio between PP and TPO. For example, the carrier layer may include a mixed-fiber nonwoven material that consists of recycling materials or renewable materials such as PP or PES and cotton fibers or other natural fibers. The mechanical properties such as the rigidity, strength and weight can be adjusted by choosing the materials, the binding fibers, the fiber lengths, the thickness, the degree of needle punching and the like accordingly.

Figure 3:
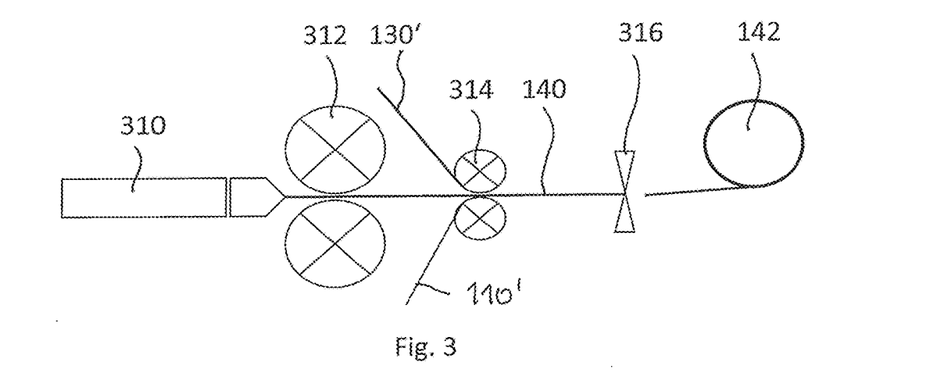
FIG. 3 shows a schematic diagram of a device for manufacturing the composite material of FIG. 2 according to an example.

FIG. 3 shows a schematic diagram of a device or system for producing a composite material for the manufacture of a trim part according to an example. The system comprises an extruder 310 and an optional downstream calender device 312 for producing the heavy layer. In the example shown, the heavy layer 120 is fed to a laminating device 314 together with an endless film material 110" on one side of the heavy layer 120 and an endless mixed-fiber nonwoven material 130' and, in this device, is joined into an endless composite material 140 by the application of heat and pressure. The endless composite material 140 is made available in the form of rolled material 142 at the outlet of the system, wherein a cutting device 316, which cuts the endless composite material 140 as needed, is schematically illustrated at the outlet of the system.

Figure 4:
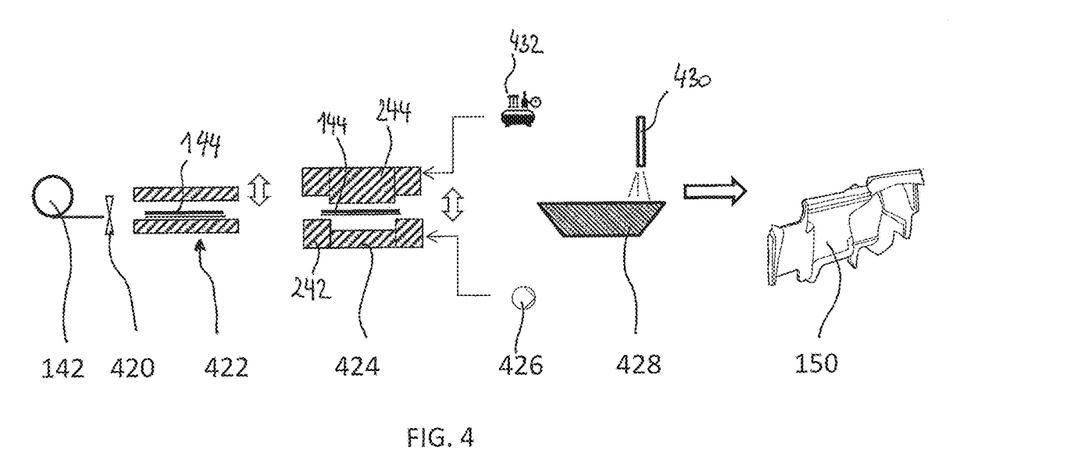
FIG. 4 shows a schematic diagram of a device for manufacturing a trim part according to an example.

The further processing of the composite material may take place in a device or system for manufacturing a trim part, wherein an example of such a system is schematically illustrated in FIG. 4. The composite material is fed to the inlet of the system in the form of the rolled material 142 and pre-cut by a cutting device 420 to make available a composite plate material or composite material plate 144, which is used for manufacturing an individual trim part. The composite plate material or the composite material plate 144 is simply referred to as composite material 144 below.

The system comprises a heating device 422, a compression molding tool 424, a vacuum generator 426 and a cutting device 428.

The composite material 144 is initially introduced into the heating device 422. The heating device 422 may comprise, for example, a contact heating unit with two opposite heating plates or an infrared heating unit. In the example according to FIG. 4, the heating device shown comprises two heating elements that may consist of heating plates of a contact heating unit or opposite infrared radiator arrangements. Although the heating device is described with reference to the example of a contact heating unit below, it is not limited to such a contact heating unit. The composite material 144 is introduced between the two heating plates, whereupon these heating plates are closed and the material is heated and pre-compressed, for example, for a heating period of 60 seconds. The heating plates are subsequently opened and the heated composite material 144 can be removed from the heating device 422.

The heating device 422 may be designed in such a way that it heats the two opposite surfaces of the composite material 244 to the same temperature or to different temperatures. For example, the cover side of the composite material 244, which points downward in the drawing, may be heated to a temperature of approximately 140° C. and the carrier side, which points upward in the drawing, may be heated to a temperature of approximately 220° C. The temperatures are chosen in such a way that particularly the carrier layer 124 and the heavy layer 122 are sufficiently heated in order to allow the sound molding thereof during the subsequent deep-drawing process. The decorative material also has to be sufficiently heated in order to be shaped in the deep-drawing process and, if applicable, provided with a grain or impression; due to the smaller thickness and the different material properties of the decorative material, a lower temperature than for molding, for example, the carrier layer may be sufficient in this case. The temperature should also be chosen in such a way that the film material 112, the varnish 114 or the printed layer 116 of the decorative material is not damaged due to excessive heating. This also applies accordingly to the carrier layer and the heavy layer. The temperatures are basically chosen in dependence on the materials used and the layer thicknesses, wherein the preceding temperature indications merely serve as an example.

After the heating process, the composite material is fed to the compression molding tool 424. In the example shown, this compression molding tool includes a first mold half or lower mold 242 with a first mold surface and a second mold half or upper mold 244 with a second mold surface. Furthermore, a vacuum generator 426 is connected to the lower mold 424 in the example shown, wherein said vacuum generator can apply a vacuum or a negative pressure to the first mold surface through the lower mold 424. For this purpose, (not-shown) bores may be provided in the lower mold, wherein said bores are connected to the vacuum generator and open into the first mold surface. A (not-shown) grain structure or another impression structure may be formed on the first mold surface in order to produce a grain or an impression on the decorative side of the composite material 144.

The compression molding tool 424 can be respectively cooled or tempered, for example by conveying a cooling fluid through the mold halves 242 and 244. For example, the temperature of the mold halves can be adjusted to approximately 25° C. or to a range between 20° C. and 60° C. The heat introduced by the heated composite material 144 is dissipated by respectively cooling or tempering the compression molding tool and the compression molding tool 424 is maintained at a constant operating temperature such that reproducible process conditions can be achieved.

The composite material 144 is introduced between the two mold halves 242 and 144 and the mold halves are closed in order to mold the heated composite material 144 into the desired shape by deep-drawing. Once the mold halves are closed, a vacuum can be applied to the first mold surface through the lower mold 424 in order to draw and hold the decorative side of the composite material 144 against the first mold surface. This ensures that a grain structure formed on the first mold surface is reliably transferred onto the decorative side of the composite material. The suction pressure of the vacuum firmly holds the decorative material on the first mold surface and also counteracts a potential displacement tendency of the decorative material due to material shrinkage. The compression tool 424 remains closed, for example, over a cooling period of 60 seconds. At this point, the molding process is completed and the composite material has been sufficiently solidified in its deep-drawn shape due to the cooling process. The vacuum is switched off and the compression molding tool is opened.

Alternatively or additionally to the vacuum generator 426, a compressed air source 432 or a steam source may be connected to the upper mold 244 in variations of the compression molding tool shown in order to convey compressed air or steam to the second mold surface through the upper mold and to thereby press the composite material 144 against the first mold surface of the lower mold 242. The effect achieved thereby is similar to the effect of the vacuum: the composite material is fixed on the first mold surface with its decorative side such that a structure formed on the first mold surface is reliably transferred and no material displacement takes place on the decorative side of the composite material.

Figure 4A:
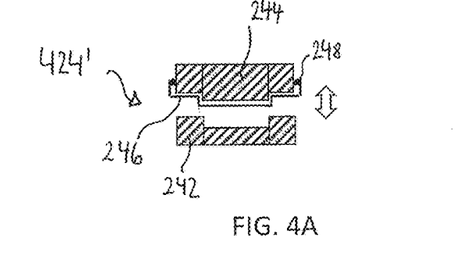
FIG. 4A shows a variation of the compression molding tool according to FIG. 4.

In another variation, which is schematically illustrated in FIG. 4A, a skin 246 for forming an air cushion die may be arranged on the upper mold 244 and span the second mold surface. This can be realized, for example, with a film that is deep-drawn on the second mold surface and peripherally connected to the upper mold in an airtight fashion; this is schematically indicated with a peripheral seal 148 in FIG. 4A. Once compressed air or steam is introduced through the upper mold, the skin forms an air cushion die that presses the composite material 144 against surface of the opposite lower mold 242, even if the composite material is air-permeable.

After its removal from the compression molding tool 224, the shaped composite material is trimmed along its edge as needed in the cutting device 428, for example with a water jet cutter 430, in order to obtain the finished trim part 150.

As explained above, the image of the printed layer 114 and the impression or grain produced during the deep-drawing process can be adapted to one another in order to provide the trim part with a surface design that optically and haptically reproduces one of a plurality of different material variations. The image and the surface structure may reproduce, for example, a nonwoven fiber material, a felt, a carpet, a wood veneer, a textile, a leather or the like, wherein the strength of the trim part can be adjusted in accordance with the reproduced surface structure by the heavy layer. This results in a broad design variety for the trim part with a very good price-performance ratio. The decorative side of the trim part, which faces the used space, is protected by the film 112 and, if applicable, the varnish layer 116 and the trim part can be easily and thoroughly cleaned due to the closed surface.

Figure 5:
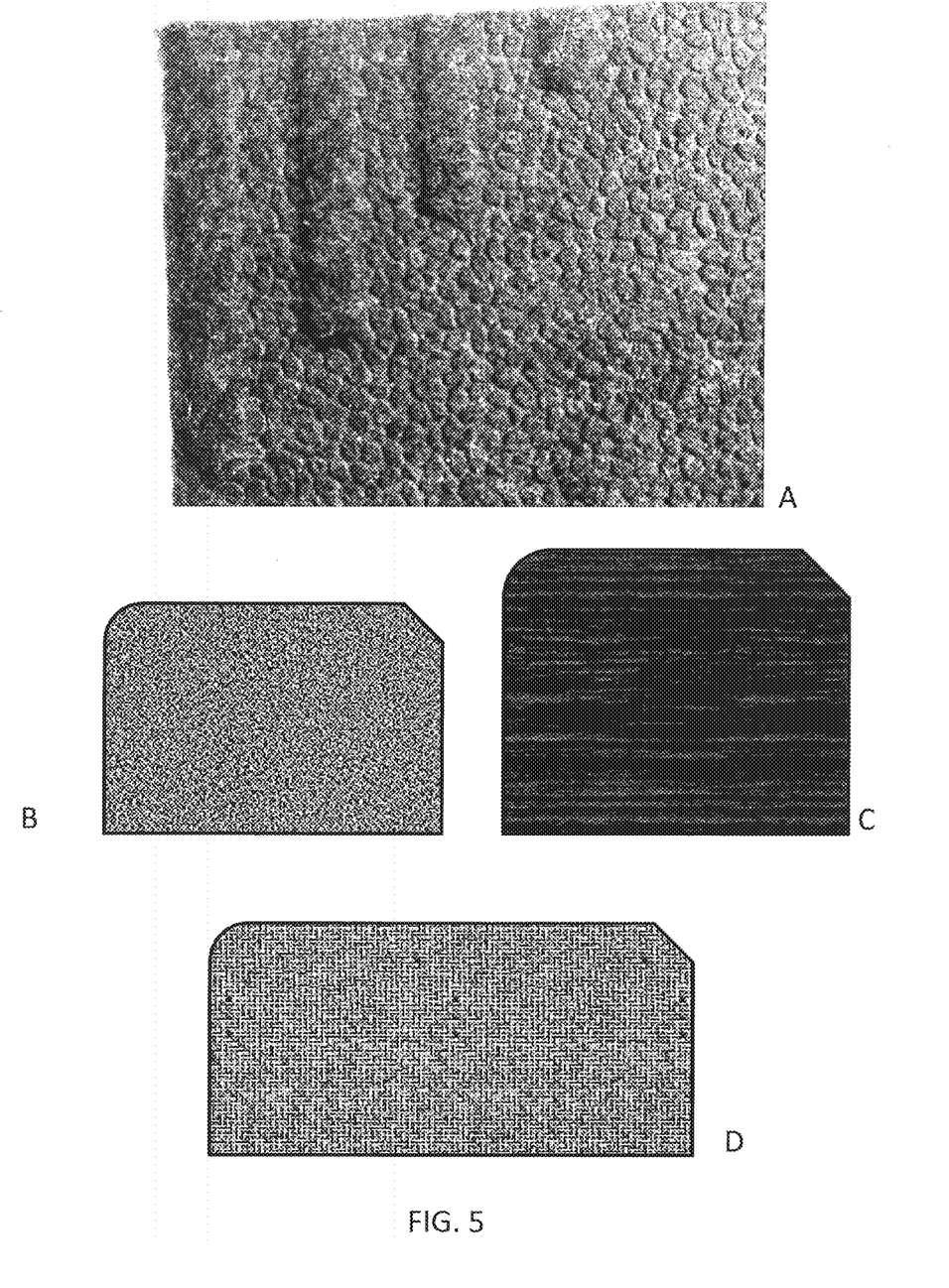
FIG. 5 shows different examples of decorative surfaces of different trim parts.

FIG. 5 shows different examples of variations for the surface design of a trim part, which are respectively identified by the reference symbols A, B, C and D. Variation A shows a surface design, in which a grain and an impression are completely produced without visual defects. Orange peel effects, uncontrolled material shrinkage and indistinguishable or distorted grain can be prevented. In variations B, C and D, the printed layer 114 contains different images, namely of a gravel surface, a wood veneer and a textile. In order to provide the trim part with a plastic three-dimensional effect that corresponds to the image, a grain or impression corresponding to the structure of the respective image can be produced on the surface of the decorative material no. Even if the structure of the grain or impression and the structure of the image are not completely congruent, it is still possible to achieve a plastic impression that is appealingly similar to that of a trim part, which actually includes a decor of the depicted material. In this context, it is also possible to realize locally different surface structures within a trim part. These may differ, for example with respect to the type of image, the coloring and/or the grain or impression.

The present disclosure therefore makes it possible to manufacture a trim part of a homogenous composite material, which in different regions optically and/or haptically "simulates" different materials and/or has different color designs in different surface regions and with respect to the manufacturing effort and the manufacturing costs, as well as its robustness, is superior to conventional trim parts manufactured of the "simulated" materials. The trim part particularly is also optimized with respect to external stresses such as strikes and scratches, the penetration of moisture and dirt, UV irradiation and the cleanability.

What is claimed is:

1. A method for manufacturing a trim part for a motor vehicle, comprising:
   supplying a carrier and a decorative thermoplastic printed film material in the form of a composite material wherein the carrier comprises a nonwoven fiber material layer and a mechanical decoupling layer, wherein the mechanical decoupling layer is disposed between the nonwoven fiber material layer and the decorative material to provide mechanical decoupling between the nonwoven fiber material layer and the decorative material;
   heating the composite material wherein the composite material is heated to a lower temperature on a side of the decorative thermoplastic printed film material than on a side of the carrier;
   introducing the heated composite material into a compression molding tool that includes a first mold half with a first mold surface and an opposite second mold half with a second mold surface, wherein the decorative material faces the first mold surface;

closing the compression molding tool to mold the composite material by drawing; and changing pressure within the compression molding tool to draw and/or press the composite material against the first mold surface and forming a grain or impression in said printed thermoplastic film material.

2. The method according to claim 1, wherein the composite material is drawn against the first mold surface by applying negative pressure or vacuum, and/or pressed against the first mold surface by applying overpressure.

3. The method according to claim 2, wherein the negative pressure or the vacuum is generated by applying suction through the first mold half, and/or the overpressure is generated by applying compressed air or steam through the second mold half.

4. The method according to claim 1, wherein an impression structure is disposed on the first mold surface, and the impression structure is formed on a surface of the decorative material by drawing and/or pressing the composite material against the first mold surface.

5. The method according to claim 4, wherein the impression structure is a grain impression structure.

6. The method according to claim 1, wherein the temperature on the side of the decorative material is approximately 120° C. to 190° C. and the temperature on the side of the carrier is approximately 220° C. to 240° C.

7. The method according to claim 1, further comprising:
joining the nonwoven fiber material layer, the mechanical decoupling layer and the decorative material by a lamination process.

8. The method according to claim 1, wherein the first mold half is a lower mold half and the second mold half is an upper mold half.

9. The method according to claim 1, wherein the film is transparent or translucent.

10. The method according to claim 1, wherein the nonwoven fiber material layer comprises synthetic fibers and/or natural fibers, wherein the synthetic fibers are formed of at least one of PP, PE, PES, PA and PET, and wherein the natural fibers are formed of at least one of kenaf, hemp, flax, jute and sisal.

11. The method according to claim 10, wherein the nonwoven fiber material layer further comprises binding fibers.

12. The method according to claim 11, wherein the binding fibers further comprise thermoplastic bicomponent fibers.

13. The method according to claim 1, wherein the mechanical decoupling layer comprises a thermoplastic polymer.

14. The method according to claim 1, wherein the nonwoven fiber material layer has a weight between 50 g/m$^2$ and 2000 g/m$^2$, and a thickness between 3 mm and 6 mm, and wherein the mechanical decoupling layer has a weight between 200 g/m$^2$ and 2000 g/m$^2$, and a thickness between 0.2 mm and 2 mm.

15. The method according to claim 1, wherein changing pressure within the compression molding tool to draw and/or press the composite material against the first mold surface further comprises changing pressure within a molding cavity of the compression molding tool when the compression molding tool is closed to draw and/or press the composite material against the first mold surface.

16. The method according to claim 1 wherein the decorative material has a thickness between 0.3 mm and 1.0 mm.

17. The method according to claim 1 wherein the decorative material has a thickness between 0.33 mm and 0.45 mm.

18. The method according to claim 1 wherein the decorative material has a weight between 100 g/m$^2$ to 300 g/m$^2$.

* * * * *